US008356254B2

(12) United States Patent
Dennard et al.

(10) Patent No.: US 8,356,254 B2
(45) Date of Patent: Jan. 15, 2013

(54) SYSTEM AND METHOD FOR INTERACTING WITH A DISPLAY (75) Inventors: Mark D. Dennard, Decatur, GA (US); Douglas J. McCulloch, Marietta, GA (US); Mark J. Schunzel, Poughkeepsie, NY (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1348 days.

(21) Appl. No.: 11/552,811

(22) Filed: Oct. 25, 2006

(65) Prior Publication Data
US 2008/0143975 A1 Jun. 19, 2008

(51) Int. Cl.
*G06F 3/048* (2006.01)

(52) U.S. Cl. ........... 715/764; 715/863; 345/156; 353/28

(58) Field of Classification Search .................. 715/719, 715/764, 863; 353/28, 42; 345/157, 156
See application file for complete search history.

(56) References Cited

U.S. PATENT DOCUMENTS

| | | | | |
|---|---|---|---|---|
| 5,528,263 | A | * | 6/1996 | Platzker et al. ............... 345/156 |
| 6,222,465 | B1 | * | 4/2001 | Kumar et al. ................... 341/20 |
| 6,266,057 | B1 | * | 7/2001 | Kuzunuki et al. ............. 715/745 |
| 6,346,933 | B1 | | 2/2002 | Lin |
| 6,353,428 | B1 | * | 3/2002 | Maggioni et al. ............. 345/157 |
| 6,385,331 | B2 | * | 5/2002 | Harakawa et al. ............. 382/106 |
| 6,554,434 | B2 | | 4/2003 | Sciammarella et al. |
| 6,802,611 | B2 | | 10/2004 | Chu et al. |
| 7,006,055 | B2 | * | 2/2006 | Sukthankar et al. ........... 345/1.2 |
| 7,129,927 | B2 | * | 10/2006 | Mattsson ....................... 345/158 |
| 7,348,963 | B2 | * | 3/2008 | Bell ............................... 345/156 |
| 7,598,942 | B2 | * | 10/2009 | Underkoffler et al. ......... 345/158 |
| 7,725,547 | B2 | * | 5/2010 | Albertson et al. ............. 709/206 |
| 7,957,554 | B1 | * | 6/2011 | Silver et al. ................... 382/103 |
| 2001/0012001 | A1 | * | 8/2001 | Rekimoto et al. ............. 345/173 |
| 2004/0102247 | A1 | * | 5/2004 | Smoot et al. ..................... 463/36 |
| 2004/0183775 | A1 | * | 9/2004 | Bell ............................... 345/156 |
| 2006/0010400 | A1 | * | 1/2006 | Dehlin et al. .................. 715/856 |
| 2006/0033725 | A1 | * | 2/2006 | Marggraff et al. ............. 345/179 |
| 2006/0187196 | A1 | * | 8/2006 | Underkoffler et al. ......... 345/156 |

FOREIGN PATENT DOCUMENTS

JP 5317345 11/1993

OTHER PUBLICATIONS

Gopal Pingali; Steerable Interfaces for Pervasive Computing Spaces; Jan. 2003; IEEE; whole document.*

(Continued)

*Primary Examiner* — Phenuel Salomon
(74) *Attorney, Agent, or Firm* — Matthew Chung; Roberts Mlotkowski Safran & Cole, P.C.

(57) ABSTRACT

A system and method of interacting with a display. The method comprises recognizing a disturbance in a display zone of a projected image and displaying a selected state in response to the recognized disturbance. The method further includes recognizing a gesture which interrupts a light source and is associated with an action to be taken on or associated with the displayed selected state. An action is executed in response to the recognized gesture. The system includes a server having a database containing data associated with at least one or more predefined gestures, and at least one of a hardware and software component for executing an action based on the at least one or more predefined gestures.

17 Claims, 9 Drawing Sheets

OTHER PUBLICATIONS

Rick Kjeldsen et al.; Interacting with Steerable Projected Displays; @ May 2002; IEEE Computer Society; pp. 1-6.*

MSDN Microsoft; Windows XP Tablet PC Edition; @ May 26, 2004.*

Pinhanez, Claudio S., et al. "IBM Research Report: Transforming Surfaces into Touch-Screens." IBM Research Division. Dec. 4, 2001.

Kjeldsen, Rick, et al. "Interacting with Steerable Projected Displays." Proc. Of 5$^{th}$ International Conference on Automatic Face and Gesture Recognition (FG '02). Washington, D.C.. May 20-21, 2002.

Pinhanez, Claudio, "Augmenting Reality with Projected Interactive Displays." IBM T.J. Watson Research Center. 2001, 9 pages.

Pinhanez, Claudio, "Using a Steerable Projector and a Camera to Transform Surfaces into Interactive Displays." IBM T.J. Watson Research Center. Apr. 2001, 2 pages.

Pingali et al. "Steerable Interfaces for Pervasive Computing Spaces." IBM T.J. Watson Research Center. Mar. 2003, 8 pages.

Voida, et al., "A Study on the Manipulation of 2D Objects in a Projector/Camera-Based Augmented Reality Environment", CHI'05. Portland. Oregon. 2005, 10 pages.

Kjeldsen, et al., "Dynamically Reconfigurable Vision-Based User Interfaces", International Journal of Machine Vision and Applications, vol. 16(1): pp. 6-12, 2004.

Levas, et al., "An Architecture and Framework for Steerable Interface Systems", Ubiquitous Computing 2003 (Ubicomp'03). Seattle, Washington. Oct. 2003, 17 pages.

Pinhanez, et al., "Applications of Steerable Projector-Camera Systems", ICCV Workshop on Projector-Camera Systems (PROCAMS'03). Nice, France. Oct. 2003, 8 pages.

Kjeldsen, et al., "Dynamically Reconfigurable Vision-Based User Interfaces", 3rd International Conference on Vision Systems (ICVS'03). Graz, Austria. Apr. 2003, 10 pages.

Pinhanez, Claudio, "The Everywhere Displays Projector: A Device to Create Ubiquitous Graphical Interfaces", Ubiquitous Computing 2001 (Ubicomp"01), Atlanta, Georgia, Sep. 2001, 18 pages.

* cited by examiner

Desktop and Keyboard Shortcut-like Behaviors

| Gesture | Description | Functionality |
|---|---|---|
| | Single Left Click (clockwise rotation) | Executes a typical single left mouse click selection |
| | Double Left Click (clockwise rotation) | Executes a typical double left mouse click selection |
| | Single Right Click (counter-clockwise rotation) | Executes a typical single right mouse click selection |
| | Copy | Executes a "Copy" command similar to keyboard short cut |
| | Paste | Executes a "Paste" command similar to keyboard short cut |
| | Undo | Executes an "Undo" command similar to keyboard short cut |
| | Redo | Executes an "Redo" command similar to keyboard short cut |

FIG. 6a

Browser-like Behaviors

| Gesture | Description | Functionality |
|---|---|---|
|  | Next | Takes the user to the next entry in a given browsable list |
|  | Previous | Takes the user to the previous entry in a given browsable list |
|  | First (in a browsable list) | Takes the user to the first entry in a given browsable list |
|  | Last (in a browsable list) | Takes the user to the last entry in a given browsable list |
|  | Home | Takes use "Home" automatically |
|  | Exit | Executes an "Exit" command and closes a given application |

SYSTEM AND METHOD FOR INTERACTING WITH A DISPLAY

FIELD OF THE INVENTION

The invention generally relates to a system and method for interacting with a projected display and, more particularly, to a system and method for interacting with a projected display utilizing gestures capable of executing menu driven commands and other complex command structures.

BACKGROUND OF THE INVENTION

Businesses strive for efficiencies throughout their organization. These efficiencies result in increased productivity of their employees which, in turn, results in increased profitability for the business and, if publicly traded, its shareholders. To achieve such efficiencies, by way of examples, it is not uncommon to hold meetings or make presentations to audiences to discuss new strategies, advances in the industry and new technologies, etc.

In such meetings, presentation boards or so-called "whiteboards" are one way to present material relevant to the presentation or meeting. As is well known, a whiteboard allows a presenter to write using special "dry erase" markers. When the text is no longer needed such material may be erased so that the user can continue with the presentation, for example. But unfortunately, often the text needs to be saved in order to refer back to the material or place new material in the proper context. In these situations, an attendee may save the material by manually copying the text in a notebook before the image is erased by the presenter. A problem with this approach is that it is both time consuming and error prone. Also, the use of whiteboards is limited because it is difficult to draw charts or other graphical images and it is not possible to manipulate data.

In another approach, it is not uncommon to use large scrolls or tear off pieces of paper to make the presentation. By using this approach, the presenter merely removes the paper from the pad (or rolls the paper) and then continues with the next sheet. This approach, though, can be cumbersome and although it allows the presenter to refer back to past writings, it is not very efficient. Additionally, this can result in many different sheets or very large scrolls of one sheet which can become confusing to the audience and, even, the presenter. Also, as with the above approach, it is difficult to draw charts or other graphical images, and it is not possible to manipulate data.

In a more technology efficient approach, the presenter can present charts or other graphical images to an audience by optically projecting these images onto a projection screen or a wall. In known applications, an LCD (liquid crystal display) projector is commonly used as the image source, where the charts, text, or other graphical images are electronically generated by a display computer, such as a personal computer (PC) or a laptop computer. In such display systems, the PC provides video outputs, but interaction with the output is limited, at best.

Also, whether the presenter is standing at a lectern, or is moving about before the audience, there is little direct control over the image being displayed upon the projection screen when using a conventional LCD/PC projection display system. For example, a conventional system requires the presenter to return to the display computer so as to provide control for the presentation. At the display computer, the presenter controls the displayed image by means of keystrokes or by "mouse commands" with a cursor in the appropriate area of the computer monitor display screen.

In some applications, an operator may use a remote control device to wirelessly transmit control signals to a projector sensor. Although the presenter acquires some mobility by means of the remote control device, the presenter still cannot interact with the data on the screen itself; that is, the operator is limited to either advancing or reversing the screen.

Accordingly, there exists a need in the art to overcome the deficiencies and limitations described hereinabove.

SUMMARY OF THE INVENTION

In a first aspect of the invention, a method comprises recognizing a disturbance in a display zone of a projected image and displaying a selected state in response to the recognized disturbance. The method further includes recognizing a gesture which interrupts a light source and is associated with an action to be taken on or associated with the displayed selected state. An action is executed in response to the recognized gesture.

In another aspect of the invention, the method comprises projecting an image on a surface using at least a source of light and a processor configured to store and execute application programs associated with the image. The method senses a first action in a display zone of the image and validates the first action. The method displays a selected state in response to the validated first action. The method further senses a gesture interrupting the light source and validates that the gesture is associated with a pre-defined command and the displayed selected state. The method executes the pre-defined command in response to the validated gesture.

In another aspect of the invention, a system comprises a server having a database containing data associated with at least one or more predefined gestures, and at least one of a hardware and software component for executing an action based on the at least one or more predefined gestures. The hardware and software compares a first action in an interaction zone to a predefined template of a shape, and a second action, which interrupts a light source, to the at least one or more predefined gestures. The system validates the first action and the second action based on the comparison to the predefined template and the at least one or more predefined gestures. The system executes the action based on the validating of the first action and the second action.

In yet another aspect of the invention, a computer program product comprising a computer usable medium having readable program code embodied in the medium includes at least one component to perform the steps of the invention, as disclosed and recited herein.

In still another embodiment, a method comprises recognizing a first action of a first object and a second action of a second. The method further includes validating a movement comprising a combination of the first action and the second action by comparison to predefined gestures and executing a complex command based on the validating of the combination of the first action and the second action.

In a further aspect of the invention, a method for deploying an application for web searching which comprises providing a computer infrastructure. The computer infrastructure is operable to: project an image on a surface; sense a first action in a predefined interaction zone of the image; validate the first action and displaying a selected state; sense a gesture; validate that the gesture is associated with a pre-defined action; and execute the pre-defined action in response to the validated gesture.

DETAILED DESCRIPTION OF EMBODIMENTS OF THE INVENTION

The invention is directed to a system and method for interacting with a projected display and more specifically to a system and method for interacting with a projected display utilizing gestures capable of executing menu driven commands and other complex command structures. The system and method can be implemented using a single computer, over any distributed network or stand-alone server, for example. In embodiments, the system and method is configured to be used as an interactive touch screen projected onto any surface, and which allows the user to perform and/or execute any command on the interactive touch screen surface without the need for a peripheral device such as, for example, a mouse or keyboard. Accordingly, the system and method is configured to provide device-free, non-tethered interaction with a display projected on any number of different surfaces, objects and/or areas in an environment.

The system and method of the invention projects displays on different surfaces such as, for example, walls, desks, presentation boards and the like. In implementations, the system and method allows complex commands to be executed such as, for example, opening a new file using a drag down menu, or operations such as cutting, copying, pasting or other commands that require more than a single command step. It should be understood, though, that the system and method may also implement and execute single step commands.

In embodiments, the commands are executed using gestures, which are captured, reconciled and executed by a computer. The actions to be executed, in one implementation, require two distinct actions by the user as implemented by a user's hands, pointers of some kind or any combination thereof. Thus, the system and method of the invention does not require any special devices to execute the requested commands and, accordingly, is capable of sensing and supporting forms of interaction such as hand gestures and/or motion of objects, etc. to perform such complex operations.

In embodiments, the system and method can be implemented using, for example, the Everywhere Display™, manufactured and sold by International Business Machines Corp. (Everywhere Display™ and IBM are trademarks of IBM Corp. in the United States, other countries, or both.) By way of example, the Everywhere Display can provide computer access in public spaces, facilitate navigation in buildings, localize resources in a physical space, bring computational resources to different areas of an environment, and facilitate the reconfiguration of the workplace.

Figure 1:
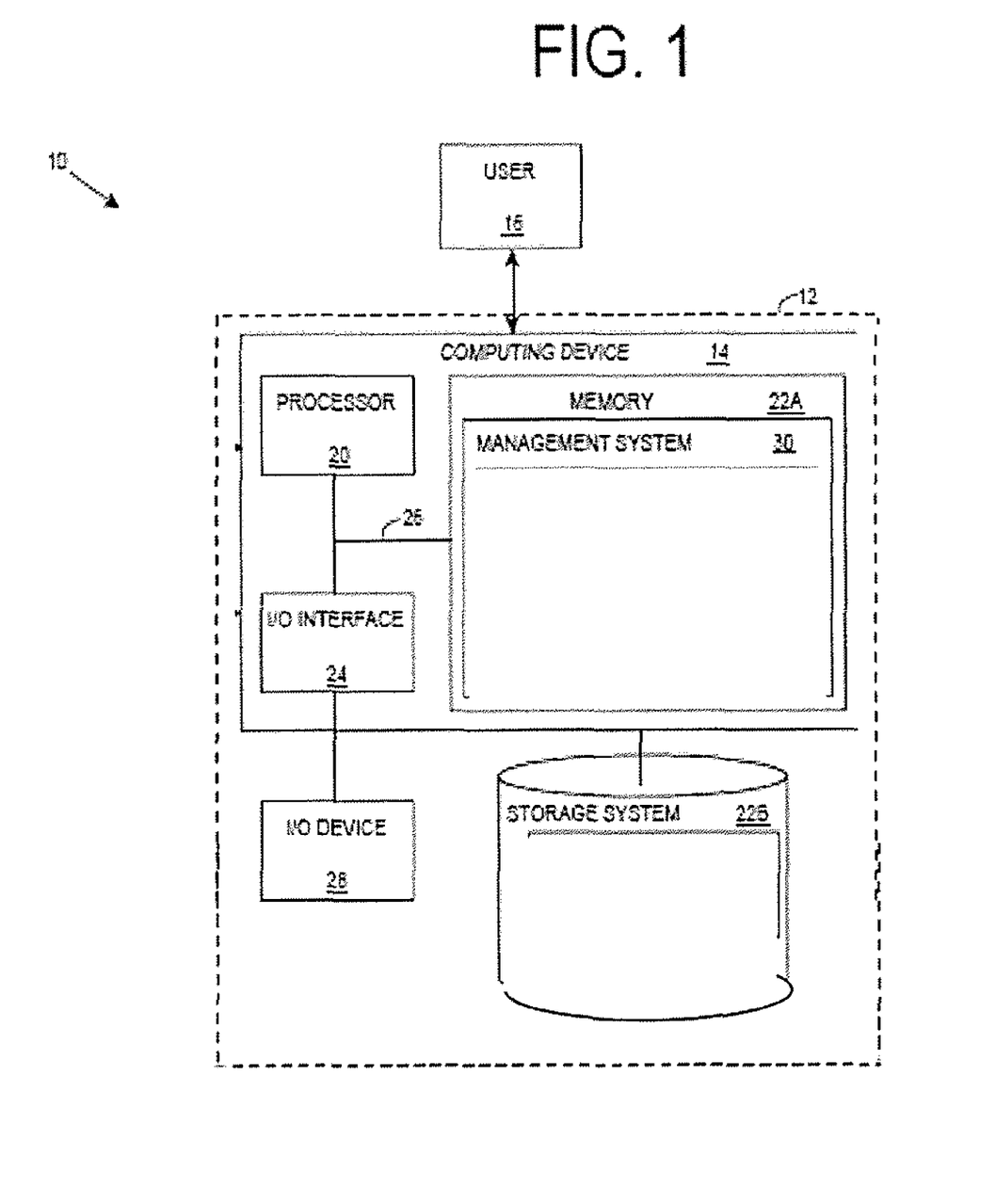
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform complex commands using gestures in accordance with the invention, e.g., process described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data from look-up tables which are the basis for the execution of the commands to be performed on the computer, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to recognize gestures and execute associated commands.

In embodiments, the invention provides a business method that performs the process steps of the invention on a subscription, advertising, and/or fee basis. That is, a service provider, such as a Solution Integrator, could offer to perform the processes described herein. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
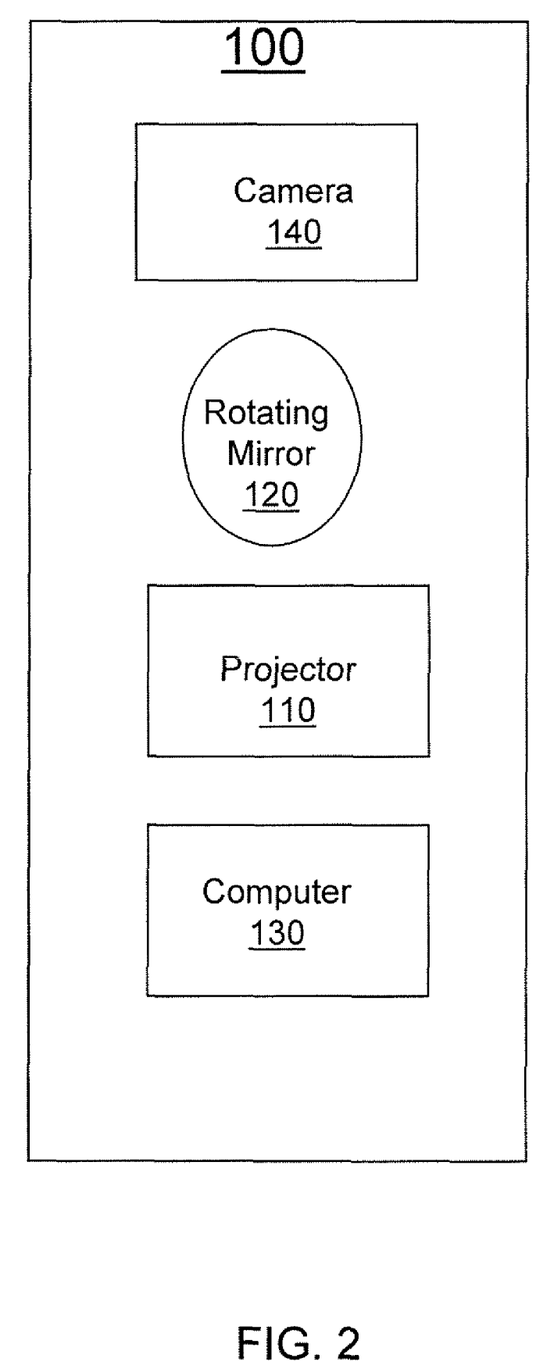
FIG. 2 shows an embodiment of a system in accordance with the invention.

FIG. 2 shows an embodiment of the system of the invention. As shown in FIG. 2, the system is generally depicted as reference numeral 100 and comprises a projector 110 (e.g., LCD projector) and a computer-controlled pan/tilt mirror 120. The projector 110 is connected to the display output of a computer 130, which also controls the mirror 120. In one non-limiting illustrative example, the light of the projector 110 can be directed in any direction within the range of approximately 60 degrees in the vertical axis and 230 degrees in the horizontal axis. Those of skill in the art should understand that other ranges are contemplated by the invention such as, for example, a range of 360 degrees in the horizontal and/or vertical axis. In embodiments, using the above ranges, the system 100 is capable of projecting a graphical display on most parts of all walls and almost all of the floor or other areas of a room. In embodiments, the projector 110 is a 1200 lumens LCD projector.

Still referring to FIG. 2, a camera 140 is also connected to the computer 130 and is configured to capture gestures or motions of the user and provide such gestures or motions to the computer 130 for reconciliation and execution of commands (as discussed in greater detail below). The camera 140 is preferably a CCD based camera which is configured and located to capture motions and the like of the user. The camera 140 and other devices may be connected to the computer via any known networking system as discussed above.

Figure 3:
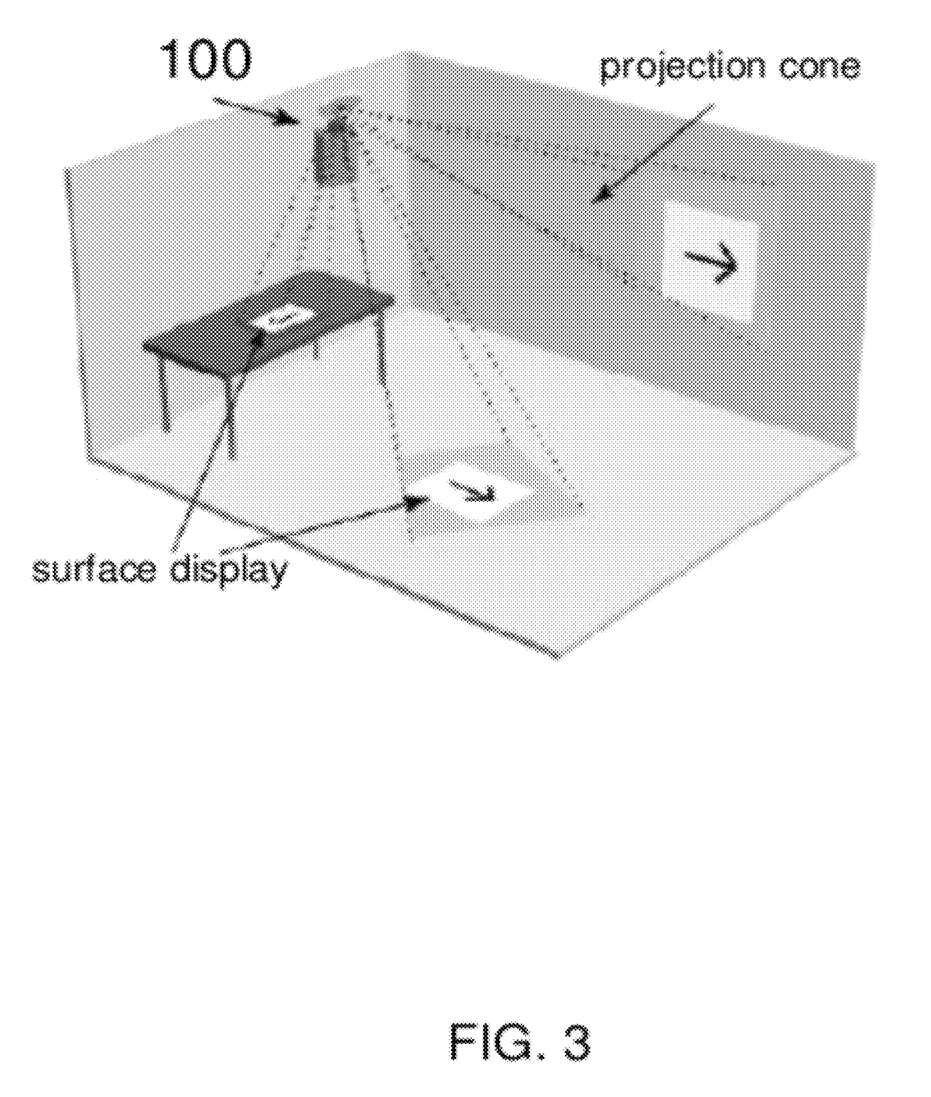
FIG. 3 is a representation of a range of motion of the system in a representative environment in accordance with an embodiment of the invention.

FIG. 3 is a representation of a range of motion of the system in a representative environment according to an embodiment of the invention. As shown in FIG. 3, the system 100 of the invention is configured to project a graphical display on walls, the floor, and a table, for example. Of course, depending on the range of the projector, the system 100 is capable of projecting images on most any surface within an environment thus transforming most any surface into an interactive display.

Figure 4:
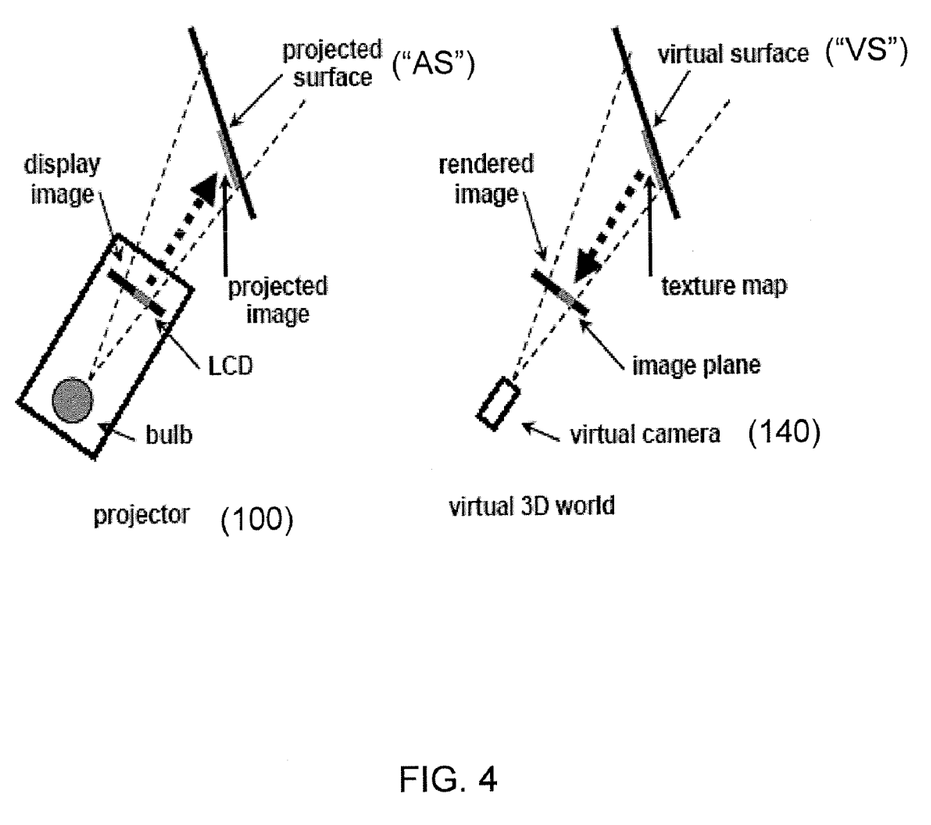
FIG. 4 represents a method to correct for distortion of a projected image on a surface or object.

FIG. 4 represents a graphical methodology to correct for distortion of the projected image caused by oblique projection and by the shape of the projected surface. To make such correction, the image to be projected is inversely distorted prior to projection on the desired surface using, for example, standard computer graphics hardware to speed up the process of distortion control. By way of illustrative example, one methodology relies on the camera 140 and projector 110 having the same focal length. Therefore, to project an image obliquely without distortions it is sufficient to simulate the inverse process (i.e., viewing with a camera) in a virtual 3-D-computer graphics world.

More specifically, as shown in FIG. 4, the system and method of the invention texture-maps the image to be displayed onto a virtual computer graphics 3D surface "VS" identical (minus a scale factor) to the actual surface "AS". The view from the 3D virtual camera 140 should correspond exactly or substantially exactly to the view of the projector (if the projector was the camera) when:

the position and attitude of the surface in the 3D virtual space in relation to the 3D virtual camera is identical (minus a scale factor) to the relation between the real surface and the projector, and
the virtual camera has identical or substantially identical focal length to the projector.

In embodiments, a standard computer graphics board may be used to render the camera's view of the virtual surface and send the computed view to the projector 110. If the position and attitude of the virtual surface "VS" are correct, the projection of this view compensates the distortion caused by oblique projection or by the shape of the surface. Of course, an appropriate virtual 3D surface can be uniquely used and calibrated for each surface where images are projected. In embodiments, the calibration parameters of the virtual 3D surface may be determined manually by projecting a special pattern and interactively adjusting the scale, rotation and position of the virtual surface in the 3D world, and the "lens angle" of the 3D virtual camera.

Figure 5:
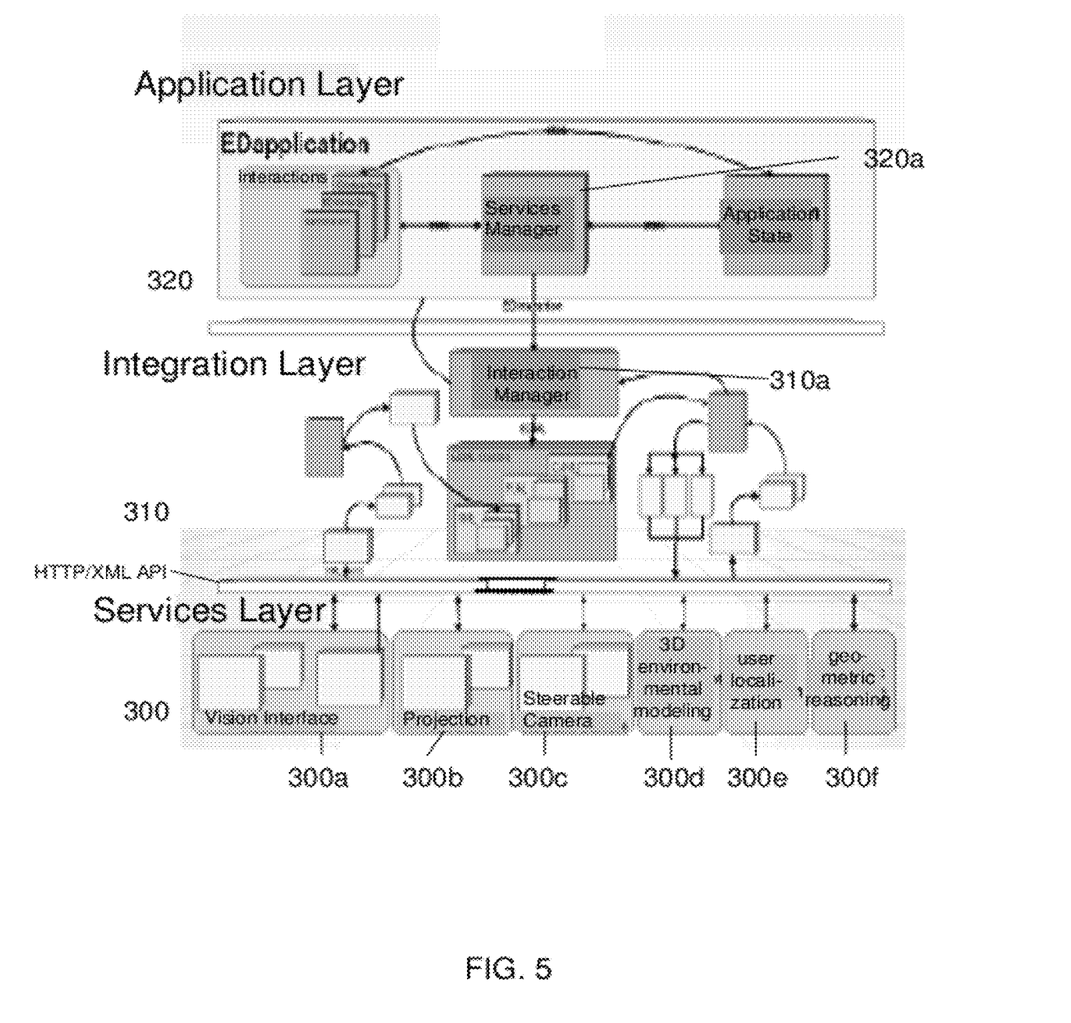
FIG. 5 shows a system architecture according to an embodiment of the invention.

FIG. 5 shows a current system architecture according to an embodiment of the invention. In embodiments, the system architecture includes a three-tier architecture comprising a services layer 300, an integration layer 310 and an application layer 320. In embodiments, each of the modules 300a-300f in the services layer 300 exposes a set of capabilities through a http/XML application programming interface (API). In embodiments, modules in the services layer 300 have no "direct" knowledge or dependence on other modules in the layer; however, the modules 300a-300f may share a common XML language along with a dialect for communication with each module in the services layer 300.

In embodiments, the services layer 300 includes six modules 300a-300f. For example, a vision interface module (vi) 300a may be responsible for recognizing gestures and converting this information to the application (e.g., program being manipulated by the gestures). A projection module (pj) 300b may handle the display of visual information (via the projector) on a specified surface while a camera module (sc) 300c provides the video input (via the camera) from the surface of interest to the vision interface (vi) 300a. The camera, as discussed above, will send the gestures and other motions of the user. Interaction with the interface by the user comprises orchestrating the vision interface 300a, projection module 300b and camera module 300c through a sequence of synchronous and asynchronous commands, which are capable of being implemented by those of skill in the art. Other modules present in the services layer 300 include a 3D environment modeling module 300d, a user localization module 300e, and a geometric reasoning module 300f.

The 3D environment modeling module 300d can be a version of standard 3D modeling software. The 3D environment modeling module 300d can support basic geometric objects built out of planar surfaces and cubes and allows importing of more complex models. In embodiments, the 3D environment modeling module 300d stores the model in XML format, with objects as tags and annotations as attributes. The 3D environment modeling module 300d is also designed to be accessible to the geometric reasoning module 300f, as discussed below.

The geometric reasoning module 300f is a geometric reasoning engine that operates on a model created by a modeling toolkit which, in embodiments, is a version of standard 3D modeling software. The geometric reasoning module 300f enables automatic selection of the appropriate display and interaction zones (hotspots) based on criteria such as proximity of the zone to the user and non-occlusion of the zone by the user or by other objects. In this manner, gestures can be used to manipulate and execute program commands and/or actions. Applications or other modules can query the geometric reasoning module 300F through a defined XML interface.

In embodiments, the geometric reasoning module 300f receives a user position and a set of criteria, specified as desired ranges of display zone properties, and returns all display zones which satisfy the specified criteria. The geometric reasoning module 300f may also have a look-up table or access thereto for determining gestures of a user, which may be used to implement the actions or commands associated with a certain application. The properties for a display zone may include, amongst other properties, the following:

1) Physical size of the display zone in some specified units such as inches or centimeters.
2) Absolute orientation defined as the angle between the surface normal of the display zone and a horizontal plane.
3) User proximity defined as the distance between the center of the user's head and the center of a display zone.
4) Position of the user relative to the display zone, defined as the two angles to the user's head in a local spherical coordinate system attached to the display zone. This indicates, for example, whether the user is to the left or to the right of a display zone.
5) Position of the display zone relative to the user, defined as the two angles to the display zone in a local spherical coordinate system attached to the user's head.
6) Occlusion percentage, which is defined as the percentage of the total area of the display zone that is occluded with respect to a specified projector position and orientation.
7) An occlusion mask, which is a bitmap that indicates the parts of a display zone occluded by other objects in the model or by the user.

The user localization module 300e is, in embodiments, a real-time camera-based tracking to determine the position of the user in the environment, as well as, in embodiments, gestures of the user. In embodiments, the user localization module 300e can be configured to track the user's motion to, for example, move the display to the user or, in further embodiments, recognize gestures of the user for implementing actions or commands.

In embodiments, the tracking technique is based on motion, shape, and/or flesh-tone cues. In embodiments, a differencing operation on consecutive frames of the incoming video can be performed. A morphological closing operation then removes noise and fills up small gaps in the detected motion regions. A standard contour-tracing algorithm then yields the bounding contours of the segmented regions. The contours are smoothed and the orientation and curvature along the contour is computed. The shape is analyze for each contour to check if it could be a head or other body part or object of interest, which is tracked by the system and method of the invention.

In the example of a head, the system looks for curvature changes corresponding to a head-neck silhouette (e.g., concavities at the neck points and convexity at the top of the head). In embodiments, sufficient flesh-tone color within the detected head region is detected by matching the color of each pixel within the head contour with a model of flesh tone colors in normalized r-g space. This technique detects multiple heads in real time. In embodiments, multiple cameras with overlapping views to triangulate and estimate the 3D position of the user are possible. This same technique can be used to recognize gestures in order for the user to interact with the display, e.g., provide complex commands.

In embodiments, the integration layer 310 provides a set of classes that enable a JAVA application to interact with the services. (Java and all Java-based trademarks are trademarks of Sun Microsystems, Inc. in the United States, other countries, or both.) The integration layer 310, in embodiments, contains a set of JAVA wrapper objects for all objects and commands, along with classes enabling synchronous and asynchronous communication with modules in the services layer 300. The integration layer 310, in embodiments, mediates the interaction among the services layer modules 300a-300f. For example, through a single instruction to the interaction manager 310a, a JAVA application can start an interaction that sends commands to the vision interface, the projection module and the mirror defining, instantiating, activating, and managing a complex interactive display interaction. Similarly, the integration layer 310, for example, can coordinate the geometric reasoning module and the 3D environment modeler in a manner that returns the current user position along with all occluded surfaces to the application at a specified interval.

In embodiments, the application layer 320 comprises a set of classes and tools for defining and running JAVA applications and a repository of reusable interactions. In embodiments, each interaction is a reusable class that is available to any application. An application class, for example, is a container for composing multiple interactions, maintaining application state during execution, and controlling the sequence of interactions through the help of a sequence manager 320a. Other tools may also be implemented such as, for example, a calibrator tool that allows a developer to calibrate the vision interface module 300a, the projection module 300b and the camera module 300c for a particular application.

In embodiments, the user interacts with the projected display by using hand gestures over the projected surface, as if the hands, for example, were a computer mouse. Techniques described above, such as, for example, using the geometric reasoning module 300f or the user localization module 300e can be implemented to recognize such gesturing. By way of non-limiting illustration, the geometric reasoning module 300f may use an occlusion mask, which indicates the parts of a display zone occluded by objects such as, for example, hand gestures of the user.

More specifically, in embodiments, the camera may perform three basic steps: (i) detecting when the user is pointing; (ii) tracking where the user is pointing; and (iii) detecting salient events such as a button touch from the pointing trajectory and gestures of the user. This may be performed, for example, by detecting an occlusion of the projected image over a certain zone, such as, for example, an icon or pull down menu. This information is then provided to the computer, which then reconciles such gesture with a look-up table, for example.

Figure 6A:
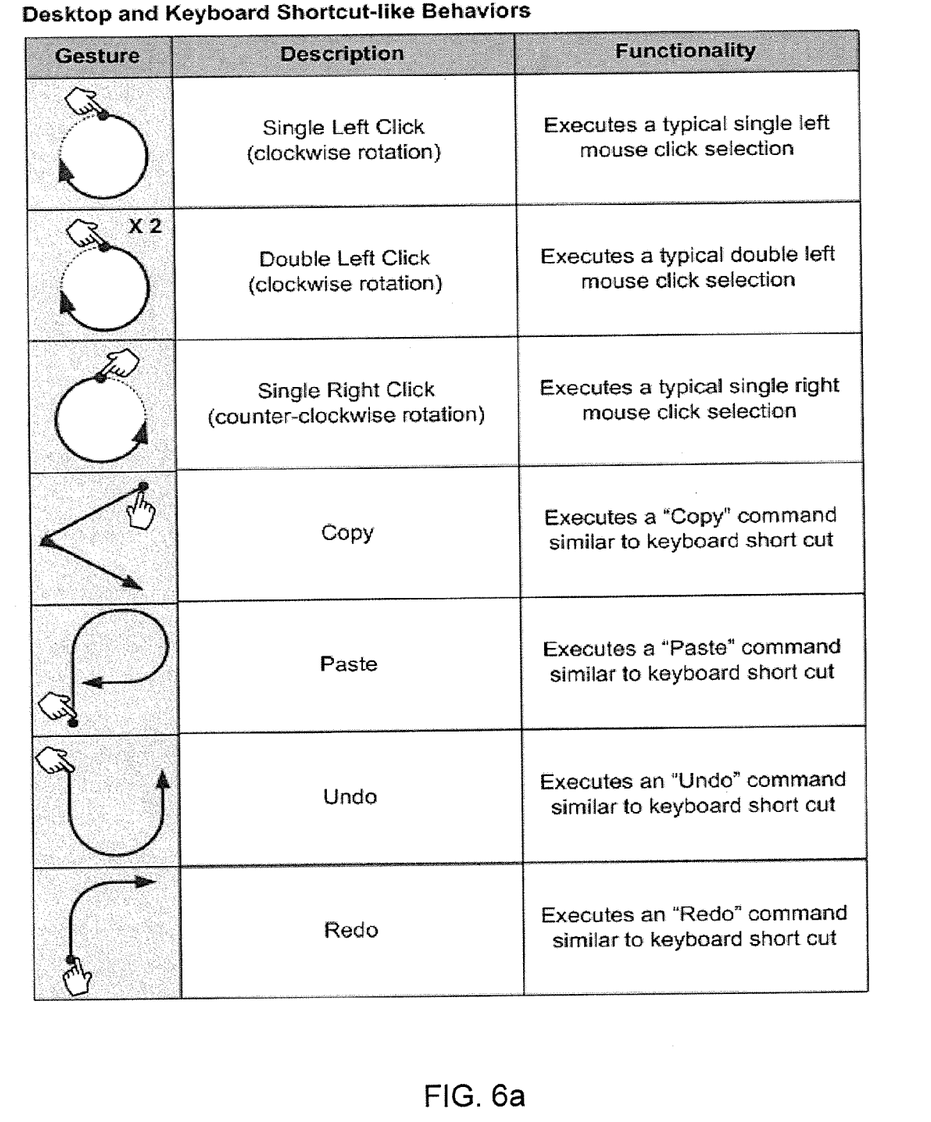
FIGS. 6a and 6b show a representative look-up table according to an embodiment of the invention.
Figure 6B:
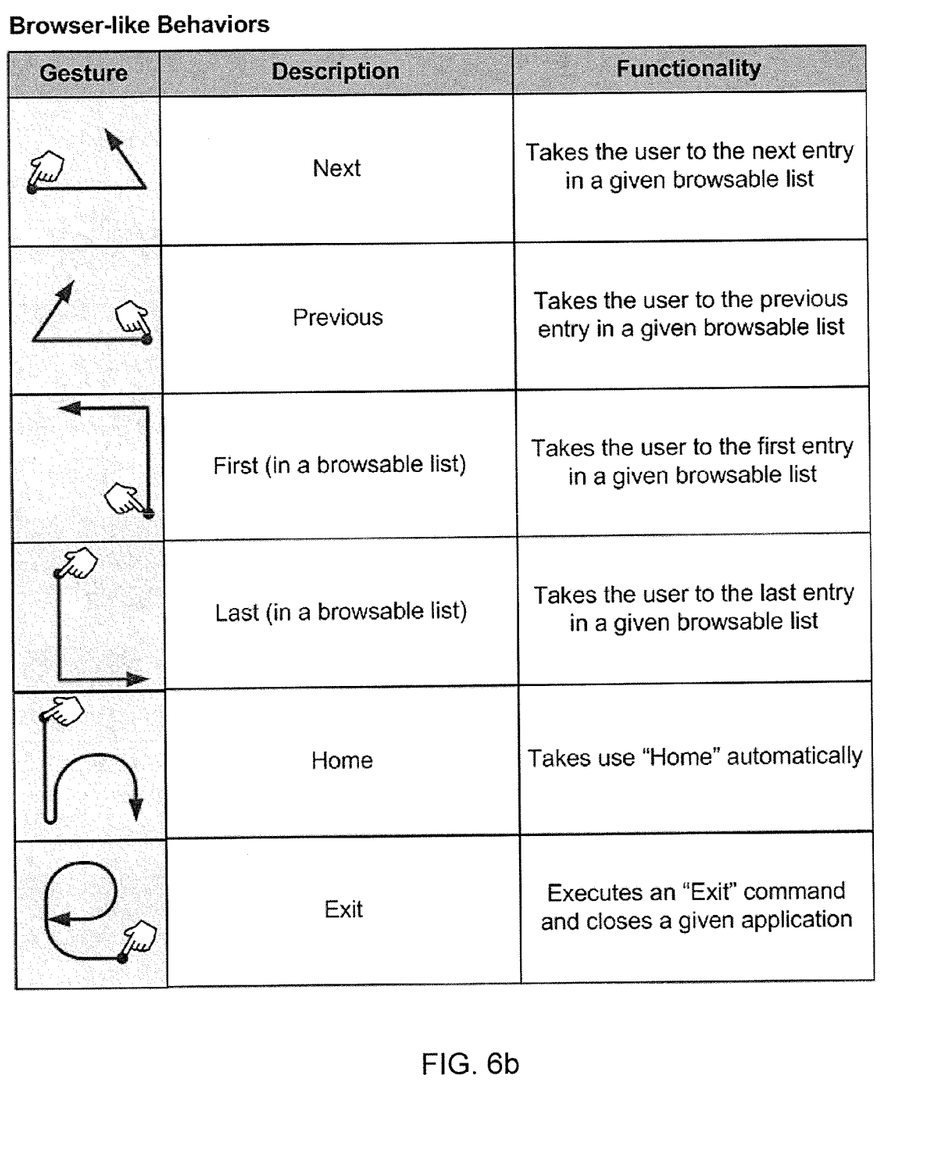

FIGS. 6a and 6b show a representative look-up table according to an embodiment of the invention. Specifically, it is shown that many complex commands can be executed using gestures such as, for example, a single left click of the mouse by the user moving his or her hand in a clockwise rotation. Other gestures are also contemplated by the invention such as those shown in the look-up tables of FIGS. 6a and 6b. It should be understood, though, that the gestures shown in FIGS. 6a and 6b should be considered merely illustrative examples.

As a further example, the invention further contemplates that a complex command can be executed based on a combination of movements by two (or more) objects, such as, for example, both of the user's hands. In this embodiment, the system and method of the invention would attempt to reconcile and/or verify a motion (gesture) of each object, e.g., both hands, using the look-up table of FIGS. 6a and 6b, for example. If both of the motions cannot be independently verified in the look-up table, for example, the system and method would attempt to reconcile and/or verify both of the motions using a look-up table populated with actions associated with combination motions. By way of one illustration, an "S" motion of both hands, which are motions not recognized, independently, may be a gesture for taking an action such as, requesting insertion of a "watermark" in a word processing application. It should be recognized by those of skill in the art that all actions, whether for a single motion or combination of motions, etc. may be populated in a single look-up table or multiple look-up tables, without any limitations.

Figure 7:
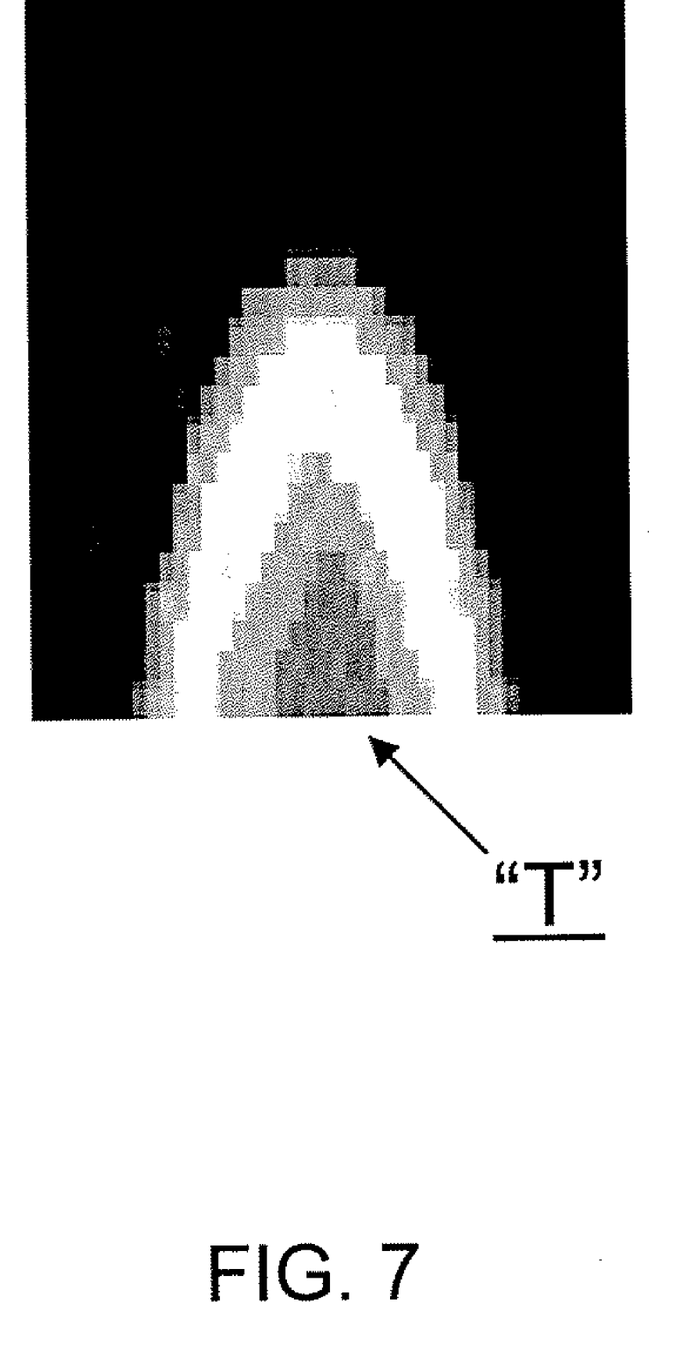
FIG. 7 shows an illustrative template used in accordance with an embodiment of the invention.

FIG. 7 shows a template which may be implemented in embodiments of the invention. Even though the appearance of an object will change as it moves across the projected image, it will create a region of changed pixels that retains the basic shape of the moving object. To find pointing fingertips, for example, each video frame is subtracted from the frame before it, removing noise with simple computational morphology, and then convolving a fingertip template "T" over the difference image using a matching function. If the template "T" does not match well in the image, it can be assumed that the user is not pointing or gesturing.

The fingertip template of FIG. 7 is kept short, in embodiments, so that it will match fingertips that extend only slightly beyond their neighbors and will match fingertips within a wider range of angles. As a result, the template often matches well at several points in the image. It should be readily understood that other templates may also be used with the invention such as, for example, pointers and other objects. These templates may also be used for implementing and recognizing the gestures, referring back to FIGS. 6a and 6b.

Figure 8:
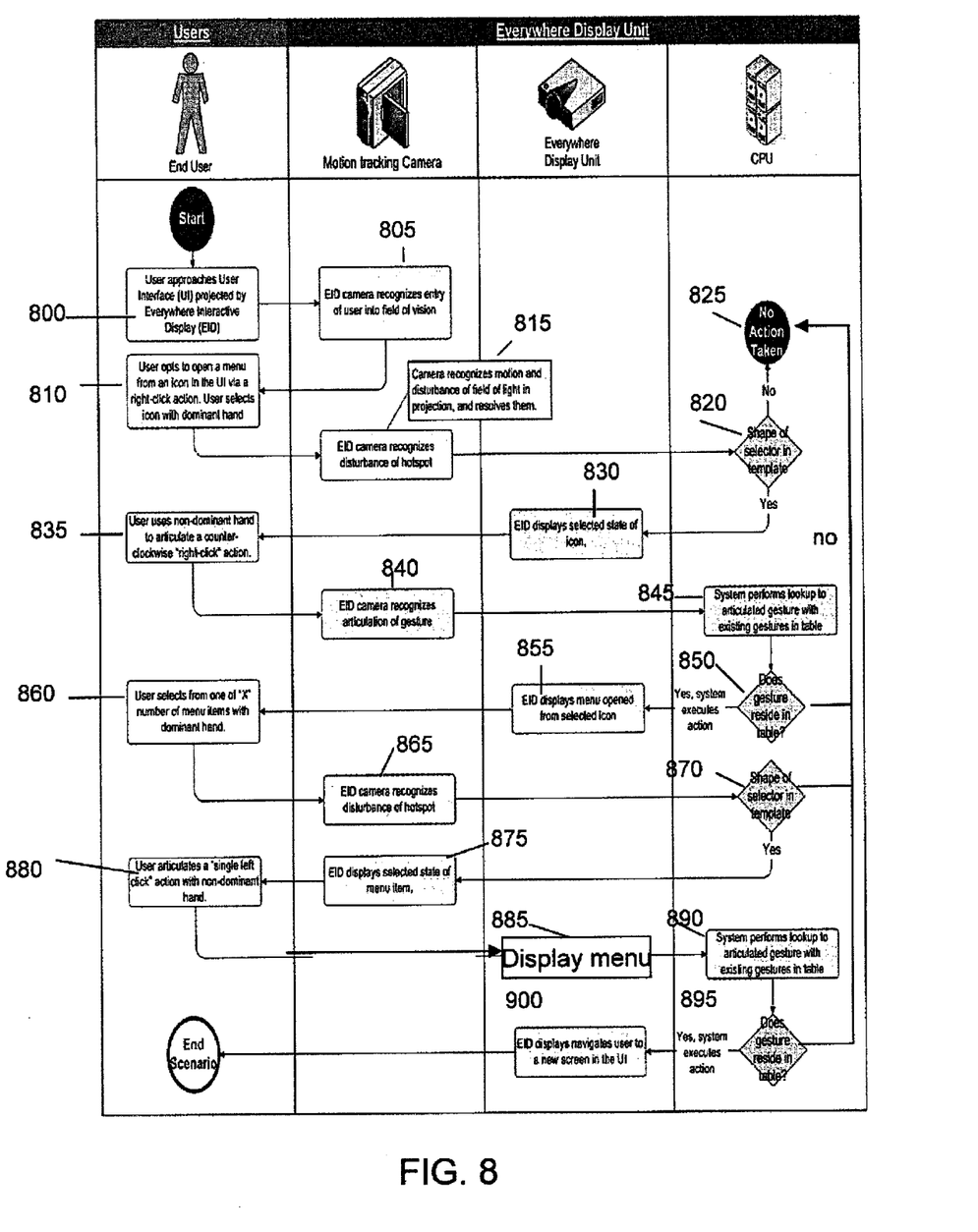
FIG. 8 is a representation of a swim lane diagram implementing steps according to an embodiment of the invention.

FIG. 8 is a swim lane diagram showing steps of an embodiment of the invention. "Swim lane" diagrams may be used to show the relationship between the various "components" in the processes and to define the steps involved in the processes. FIG. 8 may equally represent a high-level block diagram of components of the invention implementing the steps thereof. The steps of FIG. 8 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 8 may also be implemented by the embodiment of FIG. 1.

In particular, FIG. 8 shows a process flow diagram, describing a scenario in which a user performs a series of actions using the gesture based user interaction grammar provided herein. At step 800, a user approaches a wall or other surface on which the system of the invention has projected a User Interface (UI) for a given application. At step 805, the user is recognized by the camera as they disturb the field of vision for the camera. At step 810, the user opts to open a menu from an icon in the UI via a right-click action. In embodiments, the user selects the icon with dominant hand (e.g., left hand). In one example, button touches are detected by examining the hand trajectory for several specific patterns that indicate this type of motion.

At step 815, the camera recognizes the disturbance of the "hotspot" (zone) associated to the selected icon, and calls the system to validate that the shape of the disturbance is identified in the template. At step 820, a determination is made to establish if the shape of the disturbing object is a valid shape in the template. If not, then at step 825, no action is taken; however, as described above, in embodiments, the system may recognize a second disturbance or gesture, at which time the system will make a determination that the combination of the first and second motions (e.g., disturbances) are a unique, valid gesture for an action to be taken.

If a valid shape is found at step 825, then the system displays the selected state of the selected icon at step 830. In an alternative embodiment, the system may recognize two gesture simultaneously, at which time, the system will make a determination as to whether the combination of gestures is associated with an action. If so, an appropriate action will be taken. This same or similar processing may continue with other examples.

At step 835, after successful display of the selected state of the icon, at step 830, the user uses the non-dominant hand (e.g., right hand) to articulate the gesture associated to a "right-click" action, for example (counter-clockwise rotation, see look-up table of FIGS. 6a and 6b). At step 840, the camera recognizes the articulation of the gesture, and at step 845, the system performs lookup to validate that the gesture resides in the system and is associated to an action.

At step 850, a determination is made as to whether the gesture is associated to an action. If there is no associated action, the system will revert to step 825 and take no action. If there is an associated action, at step 855, the system will execute the action (e.g., display open menu). Thus, after the system successfully identifies the articulated gesture, the system displays the appropriate action (e.g., opening a menu associated to the initially selected icon).

At step 860, the user selects from one of "X" number of possible navigational menu options. At step 865, the camera recognizes the disturbance of the hotspot (interaction zone) associated to the selected menu item, and calls to validate that the shape of the disturbance is identified in the template. At step 870, a determination is made as to whether the shape of the disturbing object is a valid shape in the template. If not recognized, then the system reverts back to step 825 and takes no action. If the gesture is valid (recognized), then at step 875, the system displays the selected state of the selected menu item.

At step 880, after successful display of the selected state of the menu item, the user uses the non-dominant hand, for example, to articulate the gesture associated to a "single left-click" action (single clockwise rotation, see look-up table of FIGS. 6a and 6b). At steps 885 and 890, the camera recognizes the articulation of the gesture, and the system performs lookup to validate that the gesture resides in the system and is associated to an action.

At step 895, the system makes a determination if the gesture is associated with an action. If not, the system again reverts back to step 825. If there is an associated action, at step 900, the system execute the associated action (navigate user to associated screen in the UI, in this case). The process then ends at "E".

In a more generalized embodiment, a user points to a particular zone within the display area, e.g., a certain application. The system of the invention would recognize such action by the methods noted above. In embodiments, once the system recognizes the user within a zone and verifies that this is the proper zone, the system would "lock" that selection. Once locked, the user can then provide a gesture such as, for example, an "e" shape to exit the application, which will then verified and executed by the system of the invention.

While the invention has been described in terms of embodiments, those skilled in the art will recognize that the invention can be practiced with modifications and in the spirit and scope of the appended claims.

What is claimed is:
1. A method, comprising:
recognizing a disturbance in a display zone of a projected user interface;

validating the disturbance using one or more predefined templates of shapes;

displaying a selected state in response to the recognized disturbance;

recognizing a gesture which interrupts a source and is associated with an action to be taken on or associated with the displayed selected state, the recognized gesture comprising a combination of two simultaneous motions;

determining that the recognized gesture corresponds to a function of the user interface based on one or more look-up tables populated with a plurality of pre-defined motions and a respective plurality of functions of the user interface; and executing the function of the user interface in response to the recognized gesture;

wherein the function to be executed requires a combination of at least two command steps, including:

a first command step comprising the recognizing the disturbance, wherein the disturbance is a finger on a first hand of the user, and the recognizing the gesture, wherein the recognized gesture is a second command step of determining the recognized gesture comprised of the finger on the first hand of the user and a finger on a second hand of the user; and the method further comprising:

before recognizing the disturbance in the display zone, recognizing a user entering a field of vision of a camera, wherein the recognizing the user entering the field of vision of the camera comprises recognizing a head-neck silhouette of the user; and determining the proximity of the user's head to the user interface, wherein the proximity is the distance between the center of the user's head to the center of the display zone.

2. The method of claim 1, wherein when the disturbance is a valid shape, the selected state of a selected icon or menu item in a user interface of the projected image is displayed.

3. The method of claim 2, further comprising validating the gesture via determining that the gesture resides in a look-up table having a plurality of pre-defined gestures and is associated to the action, the plurality of pre-defined gestures comprising:

a single left click gesture that executes a single left mouse click selection;

a double left click gesture that executes double left mouse click selection;

a single right click gesture that executes a single right mouse click selection;

a copy gesture that executes a copy command;

a paste gesture that executes a paste command;

an undo gesture that executes an undo command; and a redo gesture that executes a redo command.

4. The method of claim 3, wherein the plurality of pre-defined gestures further comprise:

a next gesture that takes a user to a next entry in a list;

a previous gesture that takes the user to a previous entry in the list;

a first entry gesture that takes the user to a first entry in the list;

a last entry gesture that takes the user to a last entry in the list;

a home gesture that takes the user to a home of an application; and an exit gesture that executes an exit command and closes the application.

5. The method of claim 1, wherein the recognized gesture includes a motion of a non-tethered object between the source and the projected image.

6. The method of claim 1, wherein the recognizing the disturbance and the gesture is captured by a camera and sent to a processor which performs the recognition and execution of the function.

7. The method of claim 1, wherein the display zone is one or more areas on the projected image which are associated with an application program.

8. The method of claim 1, wherein the executed function is a menu driven command.

9. The method of claim 1, wherein the gesture is recognized as a trajectory for several specific patterns that indicate a type of motion.

10. The method of claim 1, wherein the gesture is captured, reconciled and executed by a computer to perform the action.

11. The method of claim 1, wherein the steps of claim 1 are performed on at least one of a subscription, advertising and fee basis.

12. The method of claim 1, wherein the steps of claim 1 are provided by a provider which at least one of creates, maintains and supports a computer infrastructure that performs the steps of claim 1.

13. The method of claim 12, wherein the provider receives payment from sale of advertising content to one or more third parties.

14. The method of claim 1, wherein the action is performed by a computer which communicates with a camera that captures the disturbance and gesture, and sends the captured disturbance and gesture to the computer for recognition, verification and execution.

15. The method of claim 1, further comprising correcting for distortion of the projected image caused by at least one of oblique projection and a shape of a surface.

16. The method of claim 1, wherein the source is a light source.

17. The method of claim 1, wherein the interrupting is a disturbance of a field of vision of a camera.

* * * * *